(12) United States Patent
Allen

(10) Patent No.: US 7,403,771 B2
(45) Date of Patent: Jul. 22, 2008

(54) TELECOM EQUIPMENT WITH MEMORY

(75) Inventor: Brian Allen, Spokane Valley, WA (US)

(73) Assignee: Telect Inc., Liberty Lake, WA (US)

( * ) Notice: Subject to any disclaimer, the term of this patent is extended or adjusted under 35 U.S.C. 154(b) by 386 days.

(21) Appl. No.: 11/246,995

(22) Filed: Oct. 7, 2005

(65) Prior Publication Data
US 2006/0276164 A1 Dec. 7, 2006

Related U.S. Application Data

(60) Provisional application No. 60/687,627, filed on Jun. 3, 2005.

(51) Int. Cl.
H04Q 7/20 (2006.01)
H04M 1/24 (2006.01)
H04M 3/08 (2006.01)
H04M 3/22 (2006.01)

(52) U.S. Cl. .................. 455/423; 455/9; 455/67.11; 455/67.12; 455/403; 455/514; 379/1.01; 379/14; 379/15.01; 379/32.01

(58) Field of Classification Search ............... 455/423, 455/9, 67.11, 67.12, 403, 514, 557, 426.1, 455/424; 379/1.01, 1.04, 1.03, 9, 14, 15.01, 379/15.05, 16, 22, 32.01, 32.02, 32.03
See application file for complete search history.

(56) References Cited

U.S. PATENT DOCUMENTS

| 6,359,892 | B1 * | 3/2002 | Szlam ................... 370/401 |
| 6,744,761 | B1 * | 6/2004 | Neumann et al. ......... 370/389 |
| 6,928,301 | B2 * | 8/2005 | Souissi et al. ............ 455/557 |
| 7,076,532 | B2 * | 7/2006 | Craik ..................... 709/217 |
| 2002/0044043 | A1 * | 4/2002 | Chaco et al. ........... 340/286.07 |
| 2004/0193449 | A1 * | 9/2004 | Wildman et al. ............ 705/2 |
| 2005/0180455 | A1 * | 8/2005 | Startsev et al. ............ 370/465 |
| 2006/0183457 | A1 * | 8/2006 | Fitzgibbon ............... 455/403 |

* cited by examiner

Primary Examiner—William Trost
Assistant Examiner—Huy Q Phan
(74) Attorney, Agent, or Firm—Lee & Hayes, PLLC

(57) ABSTRACT

Embodiments of telecommunications equipment with a memory device are presented herein.

20 Claims, 7 Drawing Sheets

308 INFRASTUCTURE DATA

502 DESIGNATION DATA

Componet ID
Housing ID
Locations
Connections
Routing
Connected Elements
Description
Connection Types
Signal Pathways
Descriptions

*Fig. 5*

TELECOM EQUIPMENT WITH MEMORY

RELATED APPLICATIONS

The present application claims priority under 35 U.S.C. § 119 to U.S. Provisional Application Ser. No. 60/687,627 filed Jun. 3, 2005, to Allen and titled "Cabinet with Memory", the disclosure of which is hereby incorporated by reference in its entirety.

BACKGROUND

The prevalence of cable and fiber is ever increasing as consumers desire ever increasing amount of bandwidth to receive content (e.g., network data) and communicate, e.g., via a telephone. One aspect of cable management and maintenance of a cable system is managing information regarding the numerous devices, network elements and equipment used in a telecommunications infrastructure. Traditionally designations of the interconnections of various equipment and components within a telecommunication network have been maintained on printed grids or labels provided with a piece of telecom equipment. Theses grids or labels are hand written and typically a technician setting up or maintaining a network must refer to a grid for each component or cabinet. Traditionally, equipment support information is maintained separately from the equipment itself.

These hardcopy records of equipment interconnections and information may be difficult and inconvenient to use. Additionally, maintaining the information for an entire site in a telecommunications network infrastructure, such as a central office, may involve tediously updating the designation labels at each of the individual cabinets, panels, components and so forth. Further, maintaining hard copies of product literature regarding the installation, operation, and configuration of telecommunications cabinets, components, equipment, and devices takes up valuable real estate in a centralized equipment location which might otherwise be available for additional telecom equipment. Costs such as rental, fees, operating cost, taxes, and material cost are driven upward as the space necessary to house the equipment used within a telecommunications network increases.

Thus, improving the density of equipment installable at a site and minimizing the cost of telecom infrastructure is an ever present goal in the telecommunication industry which may be frustrated by the traditional designation and information management methods.

SUMMARY

Telecommunications equipment having memory devices are described. For example, a housing in a telecommunication infrastructure may hold numerous components. Components within the housing are configured to provide signal pathways between network elements in the infrastructure. One or more memory devices provided with the housing are configured to store a variety of computer readable data regarding infrastructure which may describe equipment and interconnections made within the infrastructure. For instance, a memory device may have infrastructure data which encompasses data describing the operations, installation and configuration of equipment within infrastructure. Further, a memory device may have computer-readable designation data which describes one or more interconnections of equipment or components that provide signal pathways in the infrastructure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is another illustration of computer readable designation data.

DETAILED DESCRIPTION

It should be noted that the following devices are examples and may be further modified, combined and separated without departing from the spirit and scope thereof.

Figure 1:
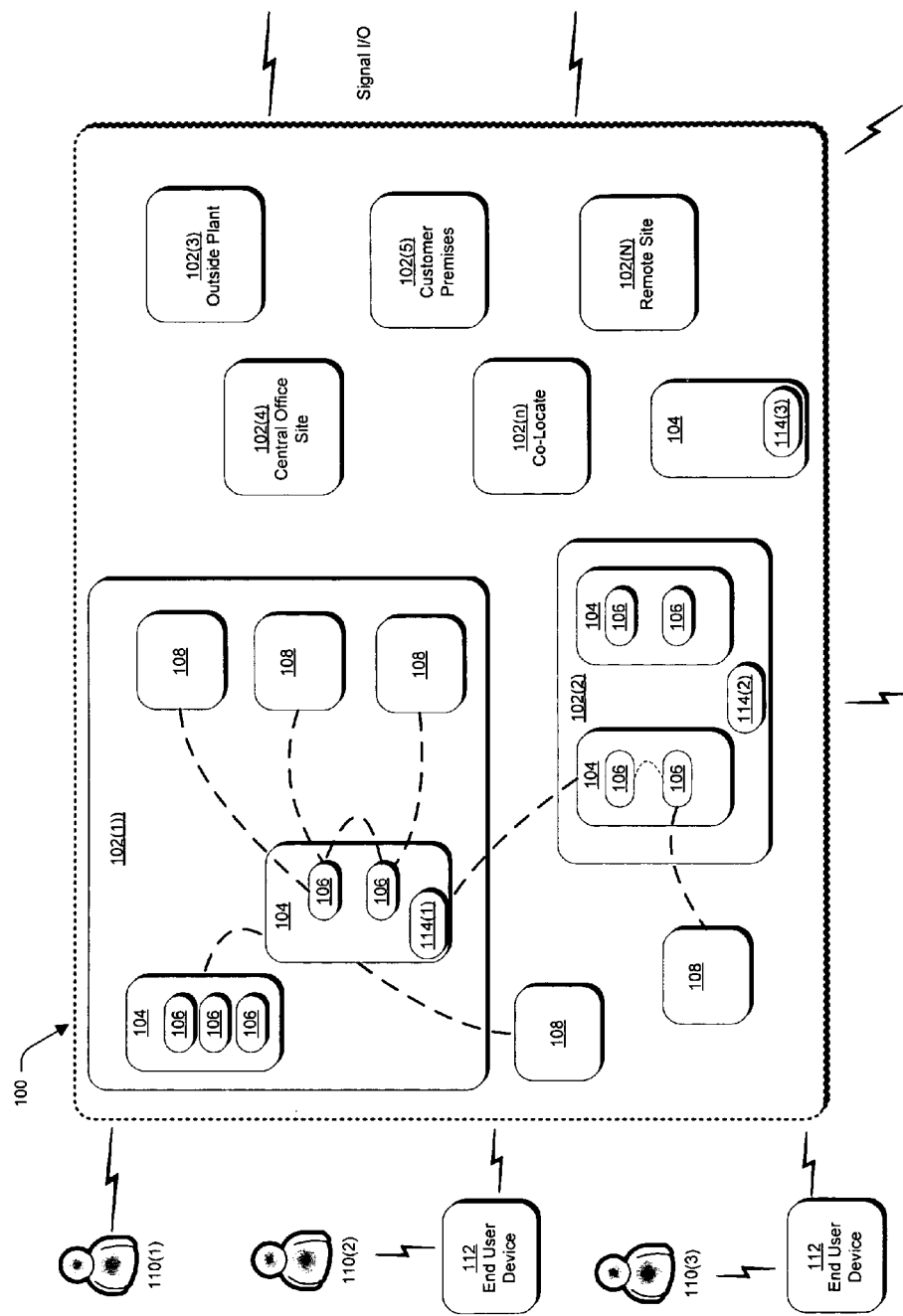
FIG. 1 is an illustration of an environment having a portion of a telecommunications infrastructure.

FIG. 1 depicts an environment which includes at least a portion of telecommunication network infrastructure 100 in which apparatuses and procedures for managing telecommunication infrastructure data may be employed. Telecommunication network infrastructure 100 (hereinafter "infrastructure") provides telecommunications processes, structures, equipment and devices between end-user devices such as modems, phones, etc. used by end-users outside of the infrastructure 100 to communicate via a telecommunications network. Within infrastructure 100 a variety of equipment, apparatus and devices are utilized in processing and distributing signals. Telecommunications signals and data may among other actions be processed, switched, routed, tested, patched, managed, or distributed by various equipment in the infrastructure 100.

A variety of sites 102(1)-102(N) within infrastructure 100 may maintain various equipment used in the infrastructure 100. As depicted in FIG. 1, infrastructure 100 may have numerous sites 102 which may be different physical locations within infrastructure 100 such as a central office, an outside plant site, a co-locate site, a remote site, or customer premises. Sites 102 may be locations within infrastructure 100 which hold a variety of structures and equipment to facilitate processing and distributing of telecommunications signals. The equipment may be centralized in one site (e.g., site 102(1)) or dispersed throughout different sites 102 in infrastructure 100. In other words, interconnections may be made between various sites 102 in infrastructure 100, for example the connection denoted in FIG. 1 by a dashed line between site 102(1) and 102(2). Naturally, numerous interconnections between a plurality of sites 102 typically may be made.

Each site 102 may have one or more housings 104 having a plurality of components 106. A housing refers to a structure to maintain or hold a plurality of components 106 in infrastructure 100 and therefore may be configured in a variety of ways. For example, the housing 104 may be configured as a housing for a cabinet, a terminal block, a panel, a chassis, a digital cross-connect, a switch, a hub, a rack, a frame, a bay, a module, an enclosure, an aisle, or other structure for receiving and holding a plurality of components 106. Hereinafter, the terms housing and cabinet will be used for convenience to refer to the variety of structures in infrastructure 100 that may hold components 106. Housings 104 may be inside a building or housings may themselves be configured to be placed outside. Housings 104 may typically be configured to protect components 106 from environmental influences. FIG. 1, for instance, depicts site 102(1) as having two housings (e.g. cabinets) 104, each having a plurality of components 106. Other housings 104 may be included throughout infrastructure 100 at sites 102, for example housings 104 depicted within site 102(2).

Components 106 are pieces of telecommunications equipment in infrastructure 100 that may be kept or maintained in a housing 104 (e.g. cabinet) within the infrastructure 100. Components for example may be cross-connect panels, modules, chassis, backplanes, switches, digital radios, repeaters and so forth. Generally, components 106 may be those devices utilized for processing and distributing signals in infrastructure 100 and which may be maintained in a housing 104. Components 106 may terminate, interconnect or cross-connect a plurality of network elements 108 within infrastructure 100. The interconnections between network elements 108 via components 106 provide signal pathways for telecommunications signals. Representative interconnections are shown by dashed lines in FIG. 1 and numerous interconnections within and between components 106 and network elements 108 are typical.

Network elements 108 may be implemented in a variety of ways. For example, network elements 108 may be configured as switches, digital cross connect system (DCS), telecommunication panels, digital radios, fiber optic equipment, network office terminating equipment, and any other telecommunication equipment or devices employed in a telecommunications infrastructure. It is noted that one or more of the components 106 within a cabinet 104 may also be a network element 108. In other words, network elements 108 may be found within a cabinet 104 as component 106 of the cabinet. Thus, components 106 in a particular cabinet 104 may be used to create interconnections between network elements 108 externally (e.g., not in the same cabinet) or internally (e.g., within the same cabinet). Naturally, internal and external interconnections may be mixed such that a single cabinet 104 will have both internal and external interconnections. Further, such connections for a particular cabinet 104 might be made wholly within a particular site 102. Interconnections may also be made between a plurality of sites 102.

The interconnection of components 106, one to another, provides signal pathways between network elements 108 for signals input to and output from the infrastructure 100. For example, end-users 110(1)-110(3) may send signals into the infrastructure and receive signals output from the infrastructure using a variety of end user devices 112. End user 110(2), for instance, may communicate with end user 110(3) via end-user device 112 (e.g., a telephone).

As FIG. 1 further depicts infrastructure 100 includes a plurality of memory devices 114(1)-114(3). Memory device 114 may store a variety of computer readable data regarding infrastructure 100 which may describe equipment and interconnections made within the infrastructure 100. For example, a memory device 114 may have infrastructure data which encompasses data describing the operations, installation and configuration of the cabinets 104, components 106, and network elements 108 within infrastructure 100. Further, memory device (e.g., memory device 114(1)) within a cabinet 104 may store infrastructure data regarding components 106 in the cabinet 104 and interconnections made between those components 106 and network elements 108. Infrastructure data may include designation data. Designation data describes the interconnections between equipment (e.g. cabinets 104, components 106, and network elements 108) at the sites 102 within a infrastructure 100.

Using memory device 114(1) as an example, infrastructure data on memory device 114(1) may include designation data describing the manner in which a portion of the sites 102, cabinets 104, components 106 and network elements 108 in infrastructure 100 are connected. For example, designation data may describe the signal pathways created between network elements 108 within site 102(1) or between sites 102 (e.g., between sites 102(1) and 102(2)) in the infrastructure 100 via components 106.

Memory device 114(1) may store infrastructure data describing the entire site 102(1) including all of the components 106, cabinets 104 and network elements 108 and interconnections thereof. In an implementation, a memory device 114 may be provided with each cabinet 104 that stores infrastructure data for components 106 and interconnections made at and within that cabinet 104. In another implementation, at least one memory device 114 is provided for a site 102 that stores infrastructure data for cabinets 104, components 106 and interconnections made at or within that site 102. Memory device 114 may also store infrastructure data for a larger or smaller portion of infrastructure 100. For example, memory device 114 may store infrastructure data for several sites 102. Memory device 114 may store infrastructure data for a collection of cabinets 104, at one site 102, such as an aisle or row of cabinets 104.

Memory device 114 further may provide infrastructure data which includes technical information about cabinets 104, components 106, and network elements 108 providing the signal pathways. Infrastructure data is accessible, such as to a technician needing to repair a portion of the infrastructure 100.

A plurality of memory devices (e.g., memory devices 114(1)-114(3)) may be located within infrastructure 100. A memory device 114 may be within a cabinet (e.g. memory device 114 (1)) or within a site such as memory device 114(2) in site 102(2). Memory device may also be elsewhere in the infrastructure as represented by memory device 114(3) in FIG. 1. Each memory device 114 is configured to store infrastructure data about at least a portion of the infrastructure.

Figure 2:
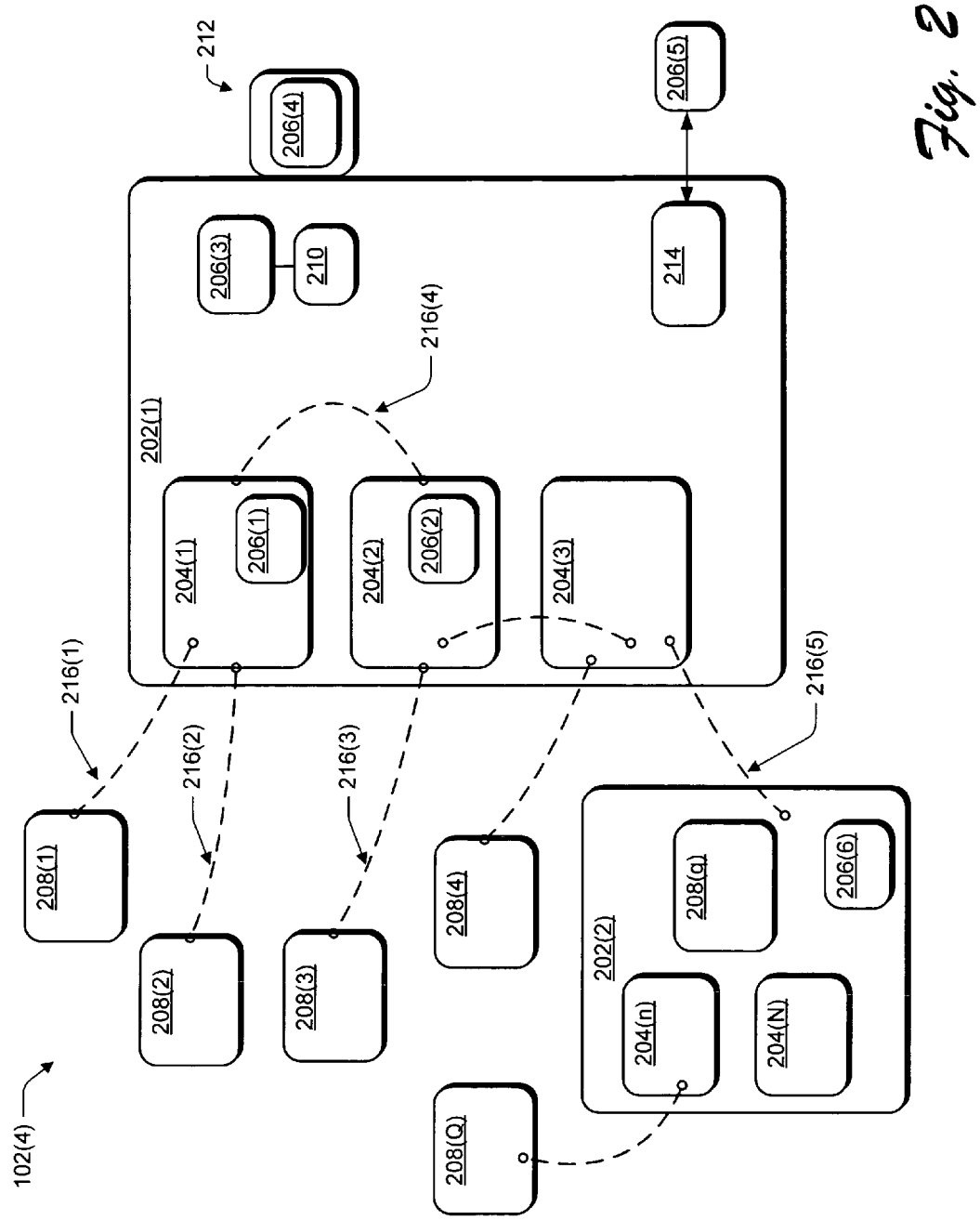
FIG. 2 is an illustration of a portion of a site within a telecommunications infrastructure.

FIG. 2 depicts a portion of site 102(4) within infrastructure 100 in greater detail. Site 102(4) has cabinets (e.g. housings) 202 configured to hold a plurality of components 204(1)-204(N). At least one memory device 206 is included. Components 204 connect a plurality of network elements 208(1)-208(Q). It is noted that while FIG. 2 depicts a portion of site 102(4), some of the equipment depicted in FIG. 2 may alternatively be located outside of site 102(4) at a different location in infrastructure 100. For example, cabinet 202(2) may be located at another site 102 such as site 102(5). Thus, connections depicted in FIG. 2 may occur between sites 102.

A memory device 206 may be implemented in a variety of ways. For example, a memory device 206 may be configured as a hard drive, a memory card, a flash memory, floppy media, a compact disk, a USB memory device, a floppy disk, random access memory or other memory device. Memory devices 206 further may be configured to store infrastructure data about a portion of infrastructure 100.

One or more memory device 206 may be located within a site 102, such as site 102(4) in a variety of implementations. FIG. 2 depicts a variety of memory devices 206(1)-206(6) in different implementations. In one implementation, memory device 206 may be associated with one or more components 204. For example, memory devices 206(1) and 206(2) are included with components 204(1) and 204(2) respectively. Memory device 206(1) may store infrastructure data regarding component 204(1) and interconnections made at and within component 204(1). Memory device 206(1) may also store infrastructure data for other components 204, and network elements 208 associated with cabinet 202(1). Further, memory device 206(1) may be configured to store infrastructure data for all the equipment within site 102(4) or a portion of site 102(4). Memory device 206(2) included with component 204(2) may likewise be configured to store infrastructure data for a portion of infrastructure 100 at the component, cabinet, or site level or other subdivision of infrastructure 100.

Additionally, a memory device 206 may be associated with a cabinet 202. In an implementation, the memory device is integrally formed to a cabinet, such as memory device 206(3) in cabinet 202(1). An interface 210 is provided with cabinet 202(1) to connect to and provide access to memory 206(3). Interface 210 may provide a communicative coupling to an external device. Coupling may be accomplished in a variety of ways, such as physical attachment (e.g., a wired connection) or adjacent through a wireless connection (e.g., radio frequency, Infrared, and so on). For example, the interface 210 may be configured to wirelessly receive and transmit infrastructure data from memory device 206(3). Memory device 206(3) may be configured to store infrastructure data for a portion of infrastructure 100 at the component, cabinet, or site level, or other subdivision of infrastructure 100. For example, memory device 206(3) may store infrastructure data for one or more of cabinet 202(1), site 102(4), or a plurality of sites 102 in infrastructure 100.

In another implementation, memory device 206 having an interface 210 is fixedly fastened to the cabinet. Memory device may be directly fastened to the cabinet such that interface 210 is accessible to retrieve infrastructure data. Fastening may be for example, by adhesive, fasteners, ties, rivets, through use of a receptacle (as described in further detail below), screws, chain or other fastening means. For example, a universal serial bus (USB) memory drive may be fastened to a cabinet by adhesive. In this implementation, memory device 206 is accessible while fastened to the cabinet 202.

In an implementation, memory device 206 may be stored in a receptacle 212 fixedly attached to a cabinet 202. Receptacle 212 may be implemented in a variety of ways. Receptacle 212 may be a box, a drawer, a shelf, a container, an enclosure, a slot, a frame or a sleeve configured to receive a memory device 206. Receptacle 212 may be fastened externally to the cabinet, using a variety of fastening means such as screws, adhesive, welds and so forth. For example, memory device 206(4) may be a flash memory card stored in receptacle 212 configured as a sleeve, a box, a shelf, or a container fixedly attached to cabinet 202(1) and configured to receive a flash memory card. In this implementation, memory device is removably associated with a cabinet 202 and accordingly is accessible by removal from the cabinet 202.

In another implementation, a receptacle 214 is integrated within a cabinet 202 to receive a memory device 206. Receptacle 214 may be configured in a variety of ways. For example receptacle 214 may be a container, a box, a slot, an enclosure or shelf integrated into the cabinet for holding a memory device. For instance, receptacle 214 may be a card slot or USB slot integrated into the cabinet to receive and hold a memory card or USB device respectively. Receptacle 214 might also be a slot to receive and hold computer readable media such as a compact disc. Memory device 206(5) may be removably inserted into receptacle 214 in cabinet 202(1). In an implementation, the memory device 206(5) may remain communicatively disconnected from cabinet 202(1) and from equipment (e.g. components 204) therein. In other words, the receptacle 214 acts as a holder for memory device 206(5) but may not provide a communicative connection to access memory device 206(5). In this implementation, memory device 206(5) may be accessed by removing it from receptacle 214.

A memory device 206 may also be removably attached to a cabinet 202. Attachment of a memory device 206 may be implemented in a variety of ways. For example, attachment may be by way of a clip, a hook, a chain, hook and loop, or other temporary fastener. Memory device 206(6) associated with cabinet 202(2), for instance, may be a floppy disk clipped to cabinet 202(2). Memory device 206(6) may be accessed by removing it cabinet 202(2).

It is noted that the various implementations described above regarding memory devices 206 associated with a cabinet 202 may be applied to a memory device 206 that is associated with a component 204. For example, memory device 206(1) may be integrally formed to component 204(1), fixedly or removably attached to component 204(1), or component 204(1) may be configured to receive and hold memory device 206(1) in an external or internal receptacle.

FIG. 2 also depicts exemplary signal pathways created by interconnections 216 of components 204 and network elements 208. As previously indicated network elements 208 may themselves be components 204. A signal pathway may be provided between network elements 208(1) and 208(2) connected to component 204(1) in cabinet 202(1) by interconnection 216(1) and 216(2) respectively. It is noted that there may be many interconnections within a component (not shown). For example, component 204(1) may have one or more internal interconnections 216 that link connection points at component 204(1) (e.g. connection points for interconnection 216(1) and 216(2)), thereby completing a signal pathway. These internal interconnections 216 may be provided in a variety of ways, such as by a printed circuit board or insertable module.

Another signal pathway may be provided between network elements 208(1) and 208(3) connected to components 204(1) and 204(2) respectively in cabinet 202(1) by interconnection 216(1) and 216(3), respectively, and by the interconnection 216(4) of components 204(1) and 204(2).

Numerous interconnections 216 and signal pathways may be created within a site 102 (e.g. site 102(4)) or between sites. Naturally interconnections 216 and signal pathways may be created between cabinets, such as interconnection 216(5) shown between cabinet 202(1) and 202(2). Interconnection 216(5) for example may provide for a signal pathway between network element 208(1) connected to component 204(1) in cabinet 202(1) and network element 208(Q) connected to component 204(n) in cabinet 202(2) via components 204 and interconnections 216 in cabinets 202(1) and 202(2). One or more memory devices 206 within site 102(4) may have computer readable infrastructure data that includes data that describe one or more of the interconnections 216 within site 102(4).

Figure 3:
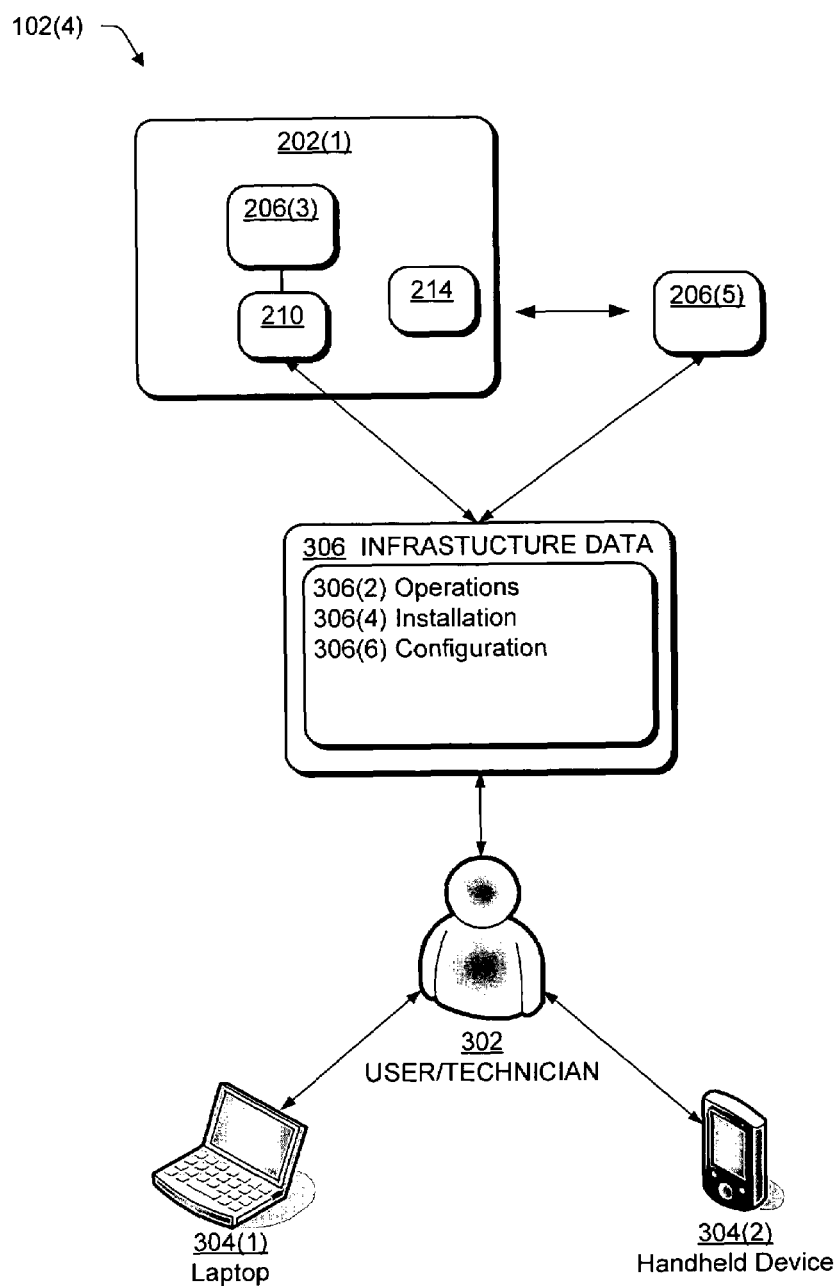
FIG. 3 is an illustration of accessing a memory device to retrieve infrastructure data.

FIG. 3 illustrates an exemplary implementation depicting accessing a memory device 206 of FIG. 2 in site 102(4). A technician (e.g. user) 302 may use an external device 304 to access, update, or store infrastructure data 306 on memory device 206. A memory device 206 maybe fixed or integrally formed in a cabinet such as memory device 206(3) depicted in cabinet 202(1). An interface 210 may be included with the memory device 206(3). Interface 210 provides access to the memory from an external device 304. The external device 304 may be a computing device such as a laptop 304(1), a hand-held device 304(2) (e.g., a personal digital assistant or wireless phone), or other computing device.

For instance, memory device 206(3) includes an interface 210 to provide a communicative coupling with an external device 304. A technician 302 may connect external device 304 to interface 210 to retrieve and update infrastructure data 306 stored on the memory device 206(3) within the cabinet. Thus, memory device 206(3) may be utilized by a technician 302 to store infrastructure data 306, to adjust the memory device to reflect changes made to the cabinet, and so on.

The interface 210 may be configured in a variety of ways. In an implementation, the interface 210 is configured for wired connection, such as via a USB port as previously described. In another implementation, the interface 210 is configured for wireless connection, such as via Bluetooth, IEEE 802.11 (e.g., IEEE 802.11(b), 802.11(g), etc.), and so on. A variety of other implementations are also contemplated. Technician 302 may accordingly use an external device 304 to make a wired or wireless connection to interface 210. The memory device 206(3) remains in the cabinet 202(1) for access or updating at a later time.

In another implementation, as previously described, a memory device may be removable from a cabinet such as memory device 206(5) associated with cabinet 202(1). In this case, technician 302 may accordingly use an external device 304 to access the removable memory device. For example, technician may remove memory device 206(5) from receptacle 214 in cabinet 202(1). External device 304 may be configured to receive and communicatively couple to memory device 206(5). Accordingly, technician 302 may couple the memory device to the external device 304 to store, access, and update infrastructure data 306. For example, memory device 206(5) may be a memory card that is insertable in a card reader included with an external device 304. Using the external device 304 the technician may store infrastructure data, adjust the memory device to reflect changes made to the cabinet, and so on. The memory device 206(5) may then be returned to receptacle 214 in cabinet 202(1) for access or updating at a later time.

In an implementation, infrastructure data 306 provided by one or more memory devices 206 may be accessible only via external devices 304 and not by a cabinet or components contained within a cabinet. In this implementation, the memory device 206 is stored at or within the cabinet (e.g. 202(1)) to provide a convenient location to retrieve infrastructure data 306. For instance, a technician 302 at a site (such as site 102(4)) when changing connections, performing maintenance, installing equipment and so forth may have convenient access to infrastructure data 306 associated with the infrastructure, the site, the cabinet or the component, with which, the technician 302 is working. A single external device 304 may be used by technician 302 to access infrastructure data from a plurality of memory devices 206 within a site (e.g. site 102(4)).

Further, a technician 302 may compile the data from a plurality of memory devices in a database accessible via an external device 304. For example, a technician 302 may access or update one or more memory device 206 included within site 102(4). The infrastructure data for each memory device may be retrieved, copied externally such as to the memory of an external device 304, and stored in a common database associated with site 102(4). Thus, the database may have infrastructure data for all of site 102(4) retrieved from one or more memory devices 206. Infrastructure data for all of infrastructure 100 may similarly be compiled in separate databases for each site 102 or in a common database for all of infrastructure 100.

As depicted in FIG. 3, infrastructure data 306 may include computer readable data describing one or more of the installation 306(2), configuration 306(4) or operation 306(6) of a portion of the infrastructure. Infrastructure data 306 may include for example housing (e.g. cabinet) identifications, component identifications, network equipment identifications, user manuals, technical manuals, maintenance procedures, standard operating procedures, maintenance records, service records, operations records, part lists, technical support information, drawings, safety procedures, material safety data sheets, database files, spreadsheet files, word processor files, contact lists, telecommunications network configurations, designation data, and so on.

Figure 4:
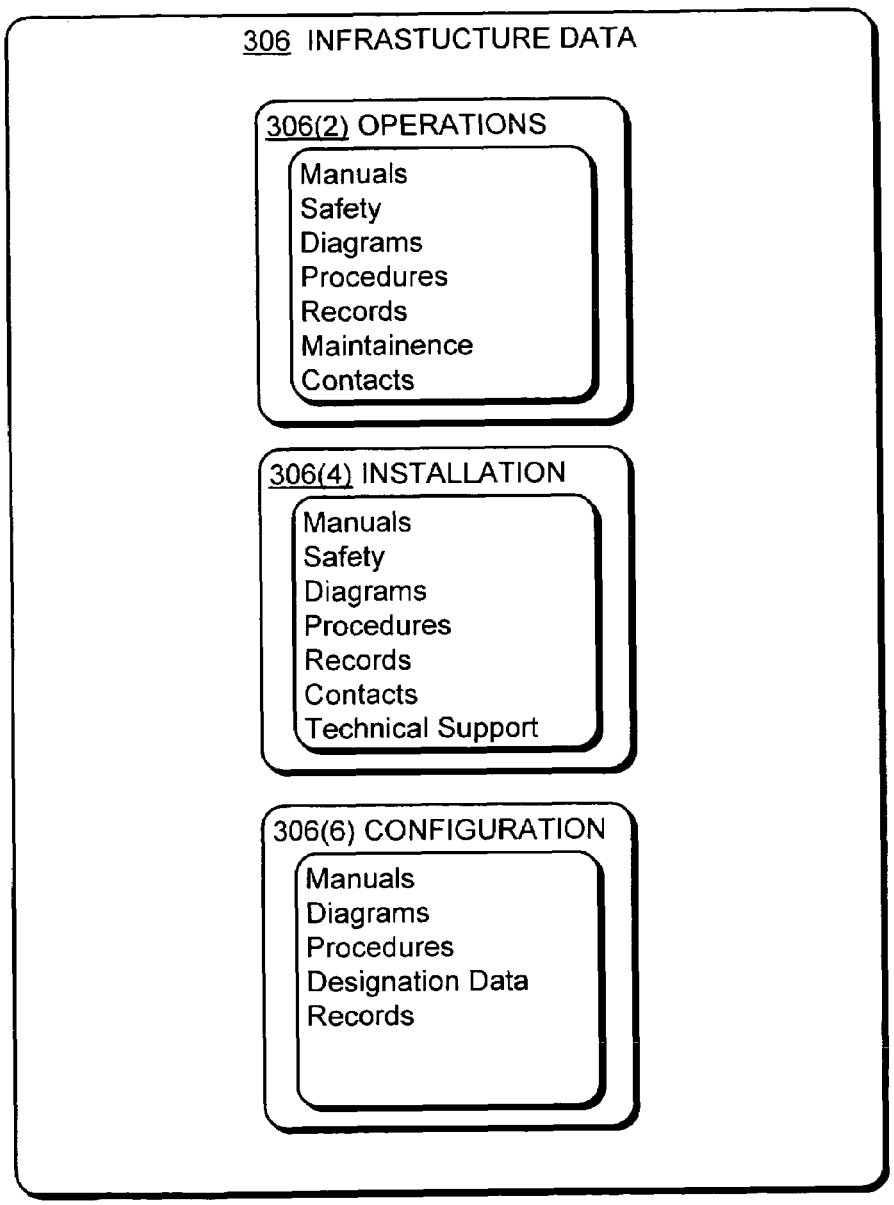
FIG. 4 illustrates computer readable infrastructure data.

FIG. 4 depicts infrastructure data 306 in greater detail. Operations data 306(2) may be a variety of data related to operation of equipment with infrastructure 100. For example, operations data 306(2) may include cabinet, component, or network element user manuals. Operations data 306(2) may also include diagrams, safety precautions and procedures, operating procedures, operating records, maintenance procedures, records, and contact lists. Similarly installation data 306(4) may be a variety of data related to installation of equipment with infrastructure 100. For example, installation data 306(4) may include user manuals, safety precautions and procedures, installation diagrams, records, technical support information, and other data or files a technician might refer to when installing a cabinet, component, etc. Configuration data 306(4) may be a variety of data related to configuration of equipment within infrastructure 100. For example, configuration data 306(6) may include configuration manuals, procedures, configuration diagrams, records, designation data, and other data or files related to configuration of equipment within infrastructure 100.

As indicated configuration data 306(6) may include designation data. Designation data describes the interconnections of equipment (e.g. components, cabinets, network elements) and signal pathways within a telecommunications network infrastructure. For example, designation data may be computer readable data which describes one or more of the routing of cables to make interconnections between components in the telecommunications infrastructure, the type of cables used, positions on equipment for interconnections, descriptions of signal pathways, and information about the components and network elements providing signal pathways.

FIG. 5 depicts designation data 502 included in infrastructure data 306 in more detail. As depicted, designation data 502 may include one or more of component identifications, housing identifications, locations or positions within a cabinet or component, connections made at locations or positions, routing paths for wires, cabling etc within a site or portion of infrastructure, identification of connected elements, description of interconnections and components or network elements being interconnected connection types such as type of cabling or connectors, and descriptions or diagrams of signal pathways.

To illustrate, reference is again made to FIG. 2 and memory device 206(1) which may store designation data. For example, 206(1) may have designation data which describes component 204(1) such as component identification, the type of component, positions for connections associated with component 204(1) and connections made to component 204(1). Further, designation data may describe one or more network elements, such as network elements 208(1) and 208(2) connected to component 204(1), including locations, identifiers, types of device, associations to other equipment and so forth. One or more interconnections 216 such as interconnections 216(1) and 216(2) may also be described, such as descriptions of the type of connection, the connectors, the position of connections, routing and so forth. Memory device 206(1) may include similar designation data for all of site 102(4) or for a portion of site 102(4) such as cabinet 202(1). Other memory devices 206 (e.g., memory devices 206(2)-206(6)) may similarly be configured with designation data for a portion of site 102(4), or infrastructure 100.

Exemplary Procedures

The following discussion describes techniques that may be implemented utilizing the previously described systems and devices. The procedures are shown as a set of blocks that specify operations performed by one or more devices and are not necessarily limited to the orders shown for performing the operations by the respective blocks.

Figure 6:
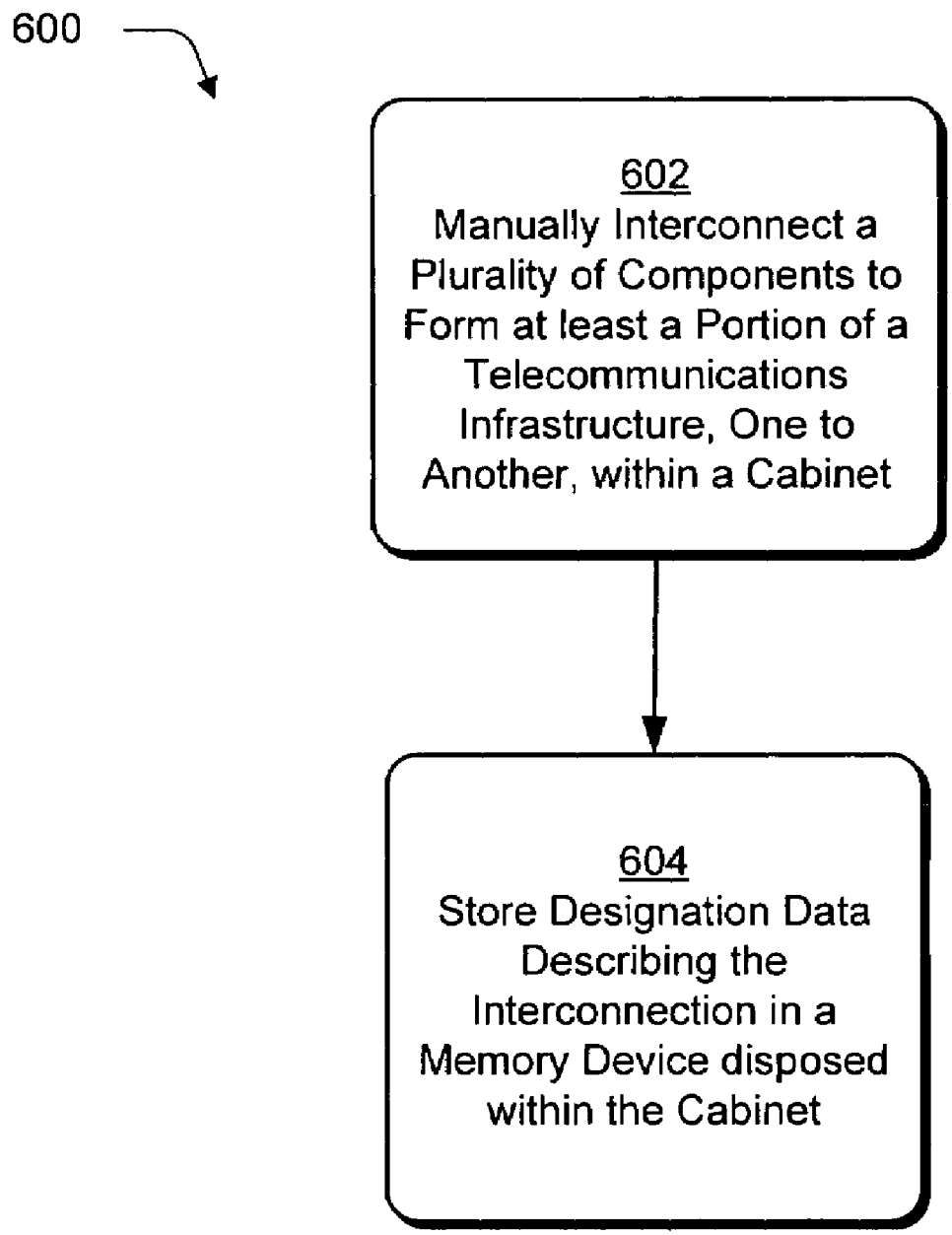
FIG. 6 is a flow diagram depicting a method of managing designation data in a telecommunications infrastructure.

FIG. 6 is a flow diagram depicting a procedure 600 in an exemplary implementation in which a memory device (e.g. memory device 206 in FIG. 2) is utilized to store and manage designation information. A plurality of components is interconnected manually within a cabinet to form at least a portion of a telecommunications infrastructure (block 602). For example, a technician may access a cabinet (e.g. cabinet 202(1) depicted in FIG. 2) and make manual interconnections (such as interconnections 216 depicted in FIG. 2).

Designation data which describes the interconnection is stored in a memory device within the cabinet (block 604). For instance, the designation data may indicate which component (e.g. component 204(1)) is connected to which other component or equipment (e.g. component 204(3), network element 208(1), network element 208(2)), locations of the equipment (for example which site 102 and cabinet 202, or position within a cabinet 202), and descriptions of interconnections 216 (e.g. type of cable used, color of the cable, position of the interconnection and so forth). Therefore, the memory device may be accessed at a later time to obtain the designation data such as by the technician or another technician.

Figure 7:
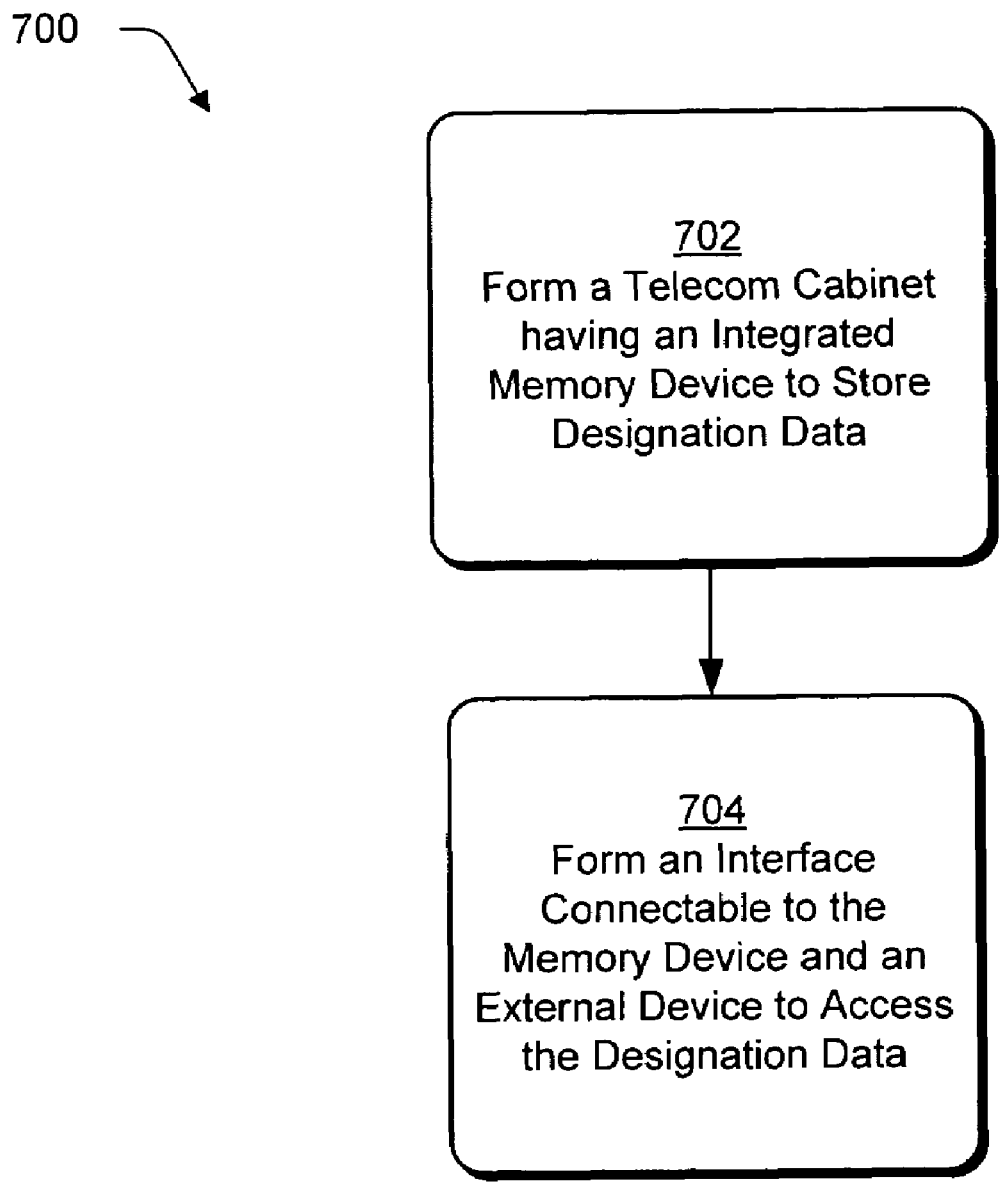
FIG. 7 is a flow diagram depicting forming an apparatus configured to store designation data in a telecommunications infrastructure.

FIG. 7 is a flow diagram depicting a procedure 700 in an exemplary implementation in which an apparatus including a memory device to store designation information is formed. A telecom cabinet is formed having an integrated memory device configured to store designation data (block 702). For instance, cabinet 202(1) depicted in FIG. 2 may be formed having an integrated memory device 206(3). Memory device 206(3) may be configured to store designation data for a portion of telecommunication infrastructure 100, such as designation data for cabinet 202(1) in site 102(4) within infrastructure 100.

An interface is formed which is connectable to the memory device and to an external device to access designation data (block 704). As with the previous example, interface 210 may be formed such that it is connectable to memory device 206(3). Accordingly, interface 210 may be configured to access designation data stored on memory device 206(3) integrally formed to cabinet 202(1).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising a housing having:
   a plurality of components configured to provide a plurality of signal pathways between network elements in a telecommunications network infrastructure; and
   a memory device having computer-readable designation data which describes one or more interconnections of said components that provide a respective said signal pathway, wherein the memory device is accessible to a user via an external device to allow the user to store, access and update the designation data of the memory device and wherein the designation data includes a position associated with one said component and a description of a connection made at the position.

2. An apparatus as recited in claim 1 wherein said housing and at least two said network elements are located within a central office site in the telecommunications network infrastructure.

3. An apparatus as recited in claim 1, wherein
   one said signal pathway is provided by a manual interconnection of two said components each connected to at least one said network element; and
   the designation data describes the manual interconnection of components, the connected network elements, and the signal pathway.

4. An apparatus as recited in claim 1 wherein at least one said network element is located at a site selected from the group consisting of:
   an outside plant site;
   a co-locate site;
   a central office site;
   a remote site; and
   a customer premises site.

5. An apparatus as recited in claim 1 wherein the housing is configured as a telecommunications equipment housing selected from the group consisting of:
   a cabinet;
   a terminal block;
   a panel;
   a chassis;
   a digital cross-connect;
   a switch;
   a hub;
   a rack;
   a frame;
   a bay; and
   a module.

6. An apparatus as recited in claim 1 wherein the memory device stores computer readable data selected from the group consisting of:
   a housing identification;
   a component identification;
   user manuals;
   technical manuals;
   maintenance procedures;
   standard operating procedures;
   maintenance records;
   service records;
   operations records;
   parts lists;
   technical support information;
   drawings;
   safety procedures;
   database files;
   spreadsheet files;
   word processor files;
   telecommunications network configurations; and
   contact lists.

7. An apparatus as recited in claim 1 wherein the external device is a selected from the group consisting of:
   a computing device; and
   a hand held device.

8. An apparatus as in claim 1 wherein designation data associated with at least two said housings is maintained in a database accessible via a computing device.

9. An apparatus comprising:
 a housing having a plurality of receptacles to receive a plurality of telecommunication components configured to provide a plurality of signal pathways in a telecommunications network infrastructure; and
 a memory device storing computer-readable data describing the installation, configuration, or operation of the plurality of telecommunications components within said infrastructure, wherein the memory device is accessible to a user via an external device to allow the user to store, access and update the designation data of the memory device and wherein the designation data includes a position associated with one said component and a description of a connection made at the position.

10. An apparatus as in claim 9 wherein the computer-readable data includes designation data which describes at least one said signal pathway provided by one or more of said components.

11. An apparatus as recited in claim 10 wherein the interface is configured to wirelessly receive and transmit data and the external device is configured to wirelessly access the memory device via the interface.

12. An apparatus as in claim 9 wherein the memory device is integrally formed to the housing.

13. An apparatus as recited in claim 9 wherein the computer-readable data is selected from the group consisting of:
 an enclosure identification;
 designation data;
 a device identification;
 user manuals;
 technical manuals;
 maintenance procedures;
 standard operating procedures;
 maintenance records;
 service records;
 operations records;
 parts lists;
 technical support information;
 drawings;
 safety procedures;
 database files;
 spreadsheet files;
 word processor files;
 telecommunications network configurations; and
 contact lists.

14. An apparatus as in claim 9 wherein the memory device is removably attached to the housing.

15. An apparatus as in claim 9 wherein the memory device is stored in a receptacle attached to the housing and configured to receive the memory device.

16. An apparatus as recited in claim 9 wherein the memory device is selected from the group consisting of:
 a hard drive;
 a memory card;
 a flash memory;
 floppy media;
 a compact disk;
 a usb memory device;
 a floppy disk; and
 random access memory.

17. A method comprising:
 manually interconnecting a plurality of components forming at least a portion of a telecommunications infrastructure, one to another, within a cabinet; and
 storing, accessing and updating, by a user, designation data describing the interconnection in a memory device disposed within the cabinet, wherein the memory device is accessible to the user via an external device and wherein the designation data includes a position associated with one said component and a description of a connection made at the position.

18. A method as recited in claim 17 wherein the memory device is not accessible to the cabinet or the plurality of components within the cabinet.

19. A method comprising:
 forming a telecommunications housing configured to receive a plurality of telecommunications components and having an integrated memory device to store computer-readable designation data; and
 forming an interface disposable within the housing and connectable to the memory device to provide a communicative coupling to an external device to access the designation data, wherein the memory device is accessible to a user via an external device to allow the user to store, access and update the designation data of the memory device and wherein the designation data includes a position associated with one said component and a description of a connection made at the position,
 wherein the memory device is configured to remain communicatively disconnected from the housing and the telecommunication components.

20. A method as recited in claim 19 wherein the interface is configured to provide a physically connection to the external device.

* * * * *